United States Patent [19]
Yamamoto

[11] Patent Number: 4,875,273
[45] Date of Patent: Oct. 24, 1989

[54] METHOD FOR ASSEMBLING ASSOCIATED COMPONENTS

[75] Inventor: Yasuhiro Yamamoto, Sayama, Japan

[73] Assignee: Honda Giken Kogyo Kabushiki Kaisha, Tokyo, Japan

[21] Appl. No.: 291,030

[22] Filed: Dec. 28, 1988

[30] Foreign Application Priority Data

Dec. 29, 1987 [JP] Japan .................................. 62-335207
Dec. 29, 1987 [JP] Japan .................................. 62-335209

[51] Int. Cl.⁴ .............................................. B23Q 3/00
[52] U.S. Cl. ....................................... 29/467; 29/464; 29/469
[58] Field of Search .................. 29/464, 467, 469, 468

[56] References Cited

U.S. PATENT DOCUMENTS

3,913,198 10/1975 Ernest et al. ...................... 29/467 X

FOREIGN PATENT DOCUMENTS

0081656 2/1988 European Pat. Off. .

Primary Examiner—Timothy V. Eley
Attorney, Agent, or Firm—Armstrong, Nikaido, Marmelstein, Kubovcik & Murray

[57] ABSTRACT

Plural associated components to be assembled to an article are set on a common set jig to have a predetermined positional relationship to each other and are wired to each other as desired. A robot arm having a plurality of assembly jigs grasps the plurality of components keeping them in the predetermined positional relationship and moves them and assembles them to the article.

2 Claims, 13 Drawing Sheets

METHOD FOR ASSEMBLING ASSOCIATED COMPONENTS

BACKGROUND OF THE INVENTION:

This invention relates to a method for assembling to an article a plurality of associated components which are associated with one another through wiring materials including cables. An example is assembling associated component units of an automotive air-conditioning system such a heater control panel, a heater unit and a blower unit to an automobile vehicle body.

The heater unit and blower unit carry various types of dampers which are interlocked through cables with various control members provided on the heater control panel. According to a conventional method of assembly, the heater control panel, the heater unit and the blower unit are separately mounted onto the vehicle body and then connected by wiring between the panel and the heater unit and between the panel and the blower unit with cables.

In the foregoing method, the wiring using cables has to be performed in a very limited space inside the cabin of a vehicle, so that the worker is subjected to undue hardship which constitutes a problem against improvement of the productivity.

It is, therefore, the object of the present invention to provide an assembling method in which not only the connection wiring is made easier but also the associated components can be assembled simultaneously to an article in order to improve greatly the productivity of the assembly work.

SUMMARY OF THE INVENTION

To achieve the above object, this invention provides an assembling method wherein a plurality of associated components associated with one another through wiring materials such as cables are assembled to an article, the method being characterized in that these associated components are set on a common set jig to have a predetermined positional relationship with one another, and connection wiring by wiring materials is carried out while they are on the set jig and thereafter the associated components are taken up by a common assembling robot comprising a robot arm and a plurality of assembling jigs mounted on the arm while being kept held in said predetermined mutual positional relationship, and then, by operation of the assembling robot, assembled to the article at predetermined fixing spots thereof.

The connection wiring work is performed while a plurality of the associated components are kept set on a common set jig, so that a wider working space can be secured and the work can be performed more easily and efficiently.

In addition, since the associated components are received by the common assembling robot while held set in their predetermined mutual positional relationship, the connection wiring materials used to connect them are not subjected to any unreasonable force during the assembly work, so that the components already with the connection wiring materials can be simultaneously assembled to the article.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENT

Figure 15:
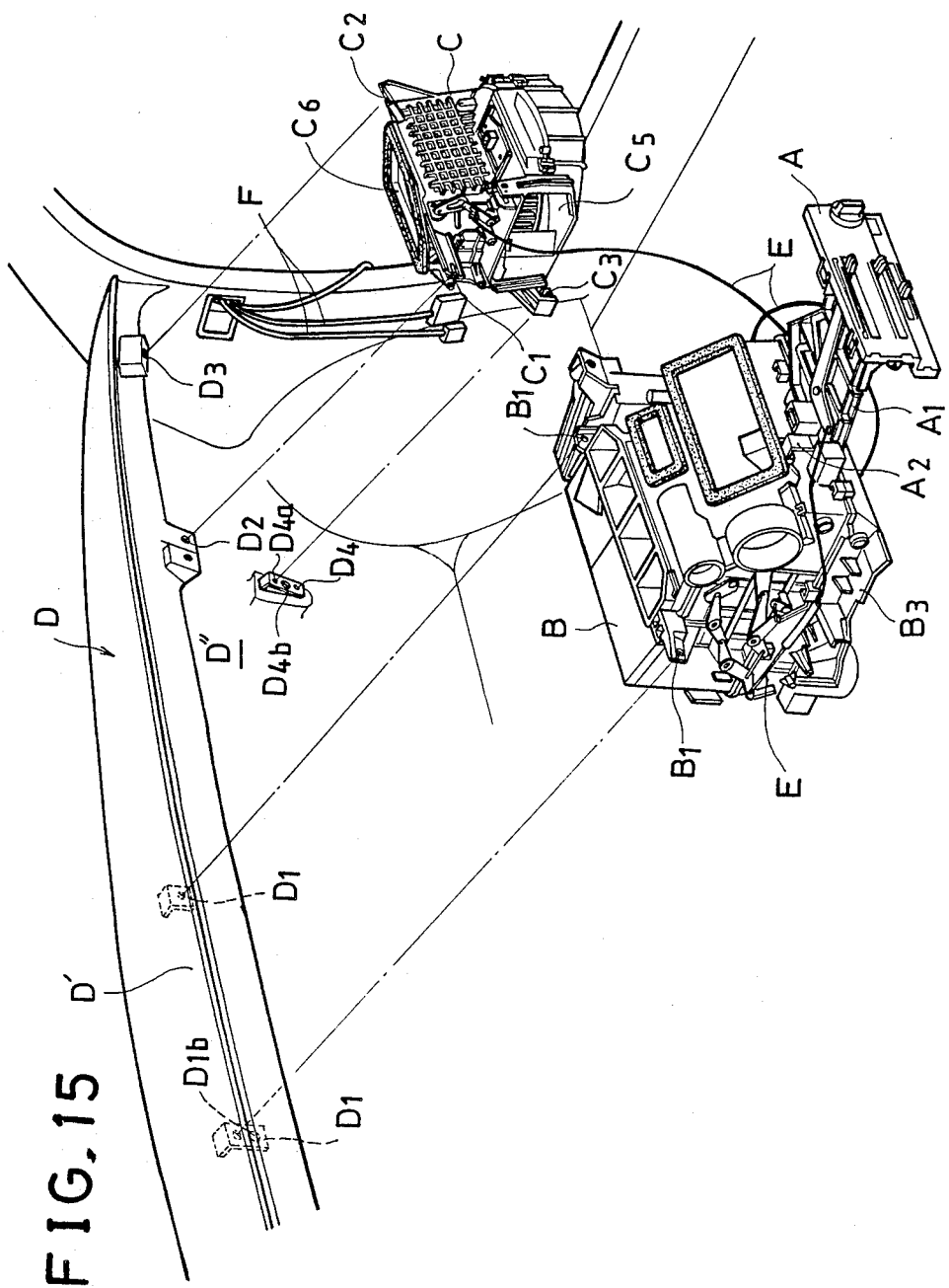
FIG. 15 is a perspective view showing the associated component units and the locations at which to attach them.

One embodiment of the present invention is applied as shown in FIG. 15 to assembling a heater control panel A, a heater unit B and a blower unit C altogether making up an air conditioning system for the vehicle onto a dashboard D of a vehicle and is explained with reference to the accompanying drawings. The vehicle body in this embodiment is that of a vehicle with a left-hand steering wheel.

Referring to FIG. 15, the heater control panel A is atched to the heater unit B by inserting a stay A2 into the rear surface of the heater unit B. The stay A2 is provided at the front end of a support frame A1 extending forward from the panel. The heater unit B is provided on its upper left and right sides with stays B1, B1 respectively and is attached securely to the dashboard by having said stays B1, B1 fastened by means of bolts to corresponding brackets D1, D1 projecting downward from under the central portion of the upper part D' of the dashboard D.

To attach the blower unit C to the dashboard D, stays C1, C2 provided at both the upper left and right sides thereof are fastened to left and right fitting supports D2, D3 located in the right corner portion of the upper part D' of the dash-board D while a stay C3 provided at the lower left front portion of the unit C is fastened to a bracket D4 fixed to the lower part D" of the dashboard D, all by bolts.

Connection wiring by cables E between the heater control panel A and the heater unit B is carried out so that various operational members such as a blowing mode selector damper, etc. built therein may be interlocked with controls provided on the panel A, and connection wiring by cables E between the panel A and the blower unit C is also carried out so that an indoor-/outdoor air selector damper or the like built into the blower unit C may be interlocked with an indoor/outdoor air selector lever or the like provided on the panel.

Figure 1:
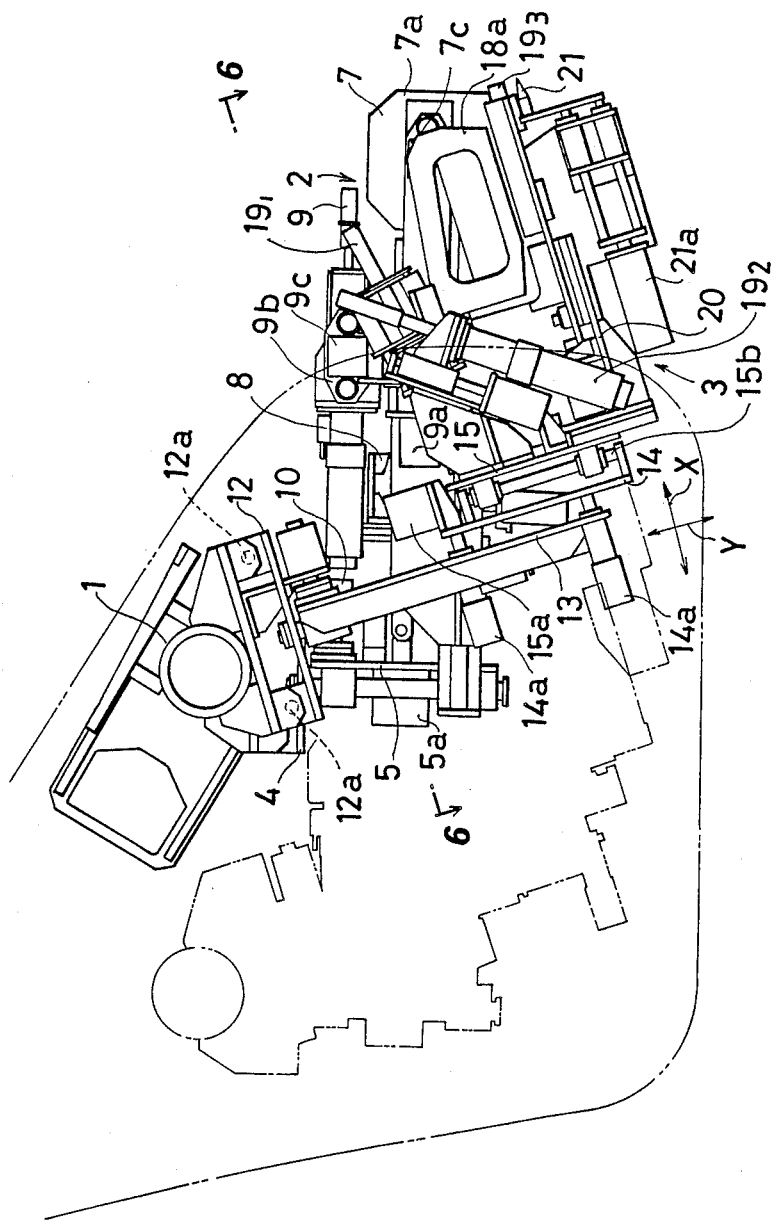
FIG. 1 is a side view showing a robot arm portion an assembling robot used in an embodiment of the present invention.
Figure 2:
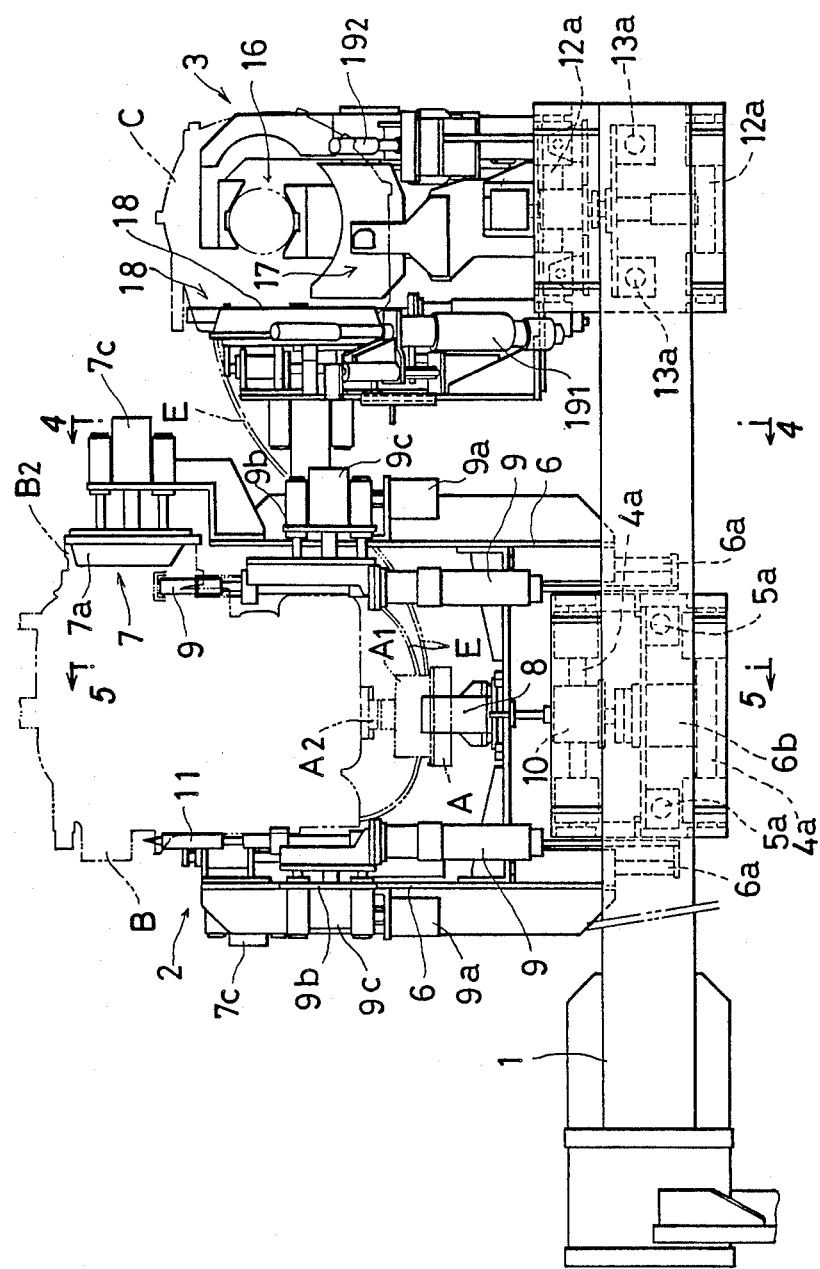
FIG. 2 is a top view thereof.
Figure 3:
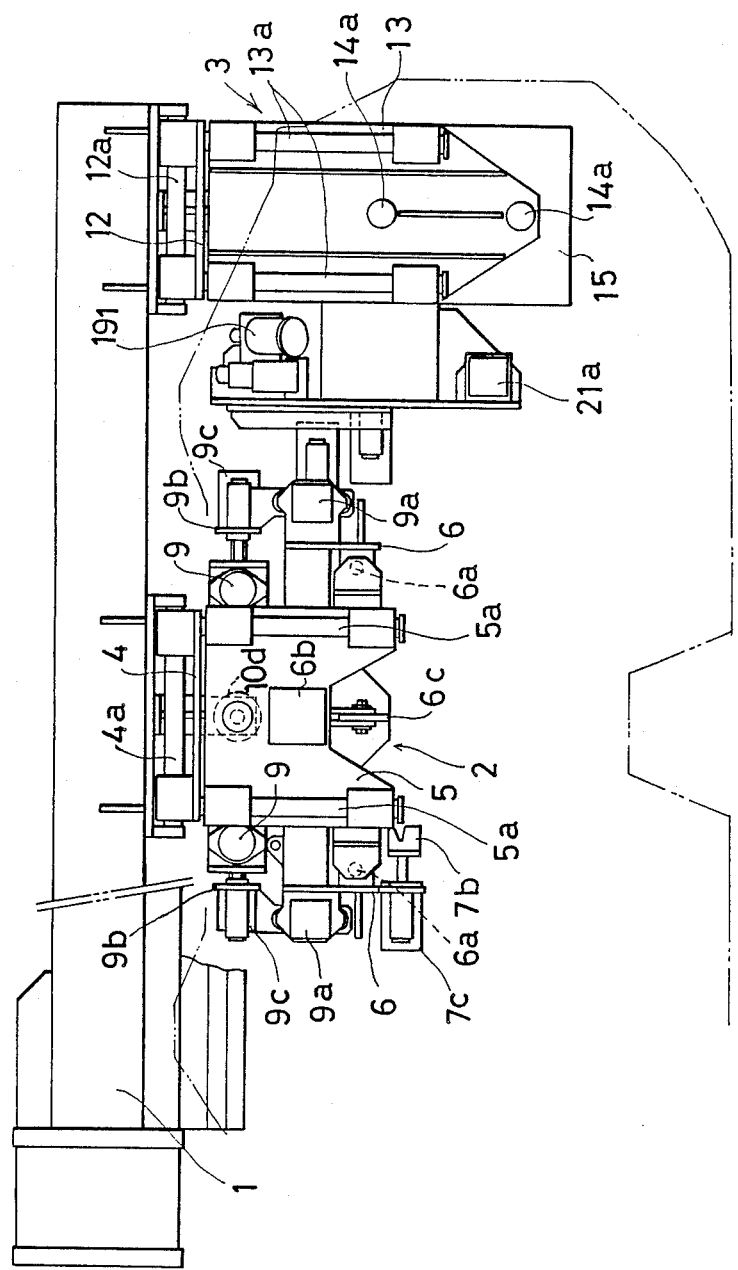
FIG. 3 is a front view thereof as seen from the left side in FIG. 1.
Figure 4:
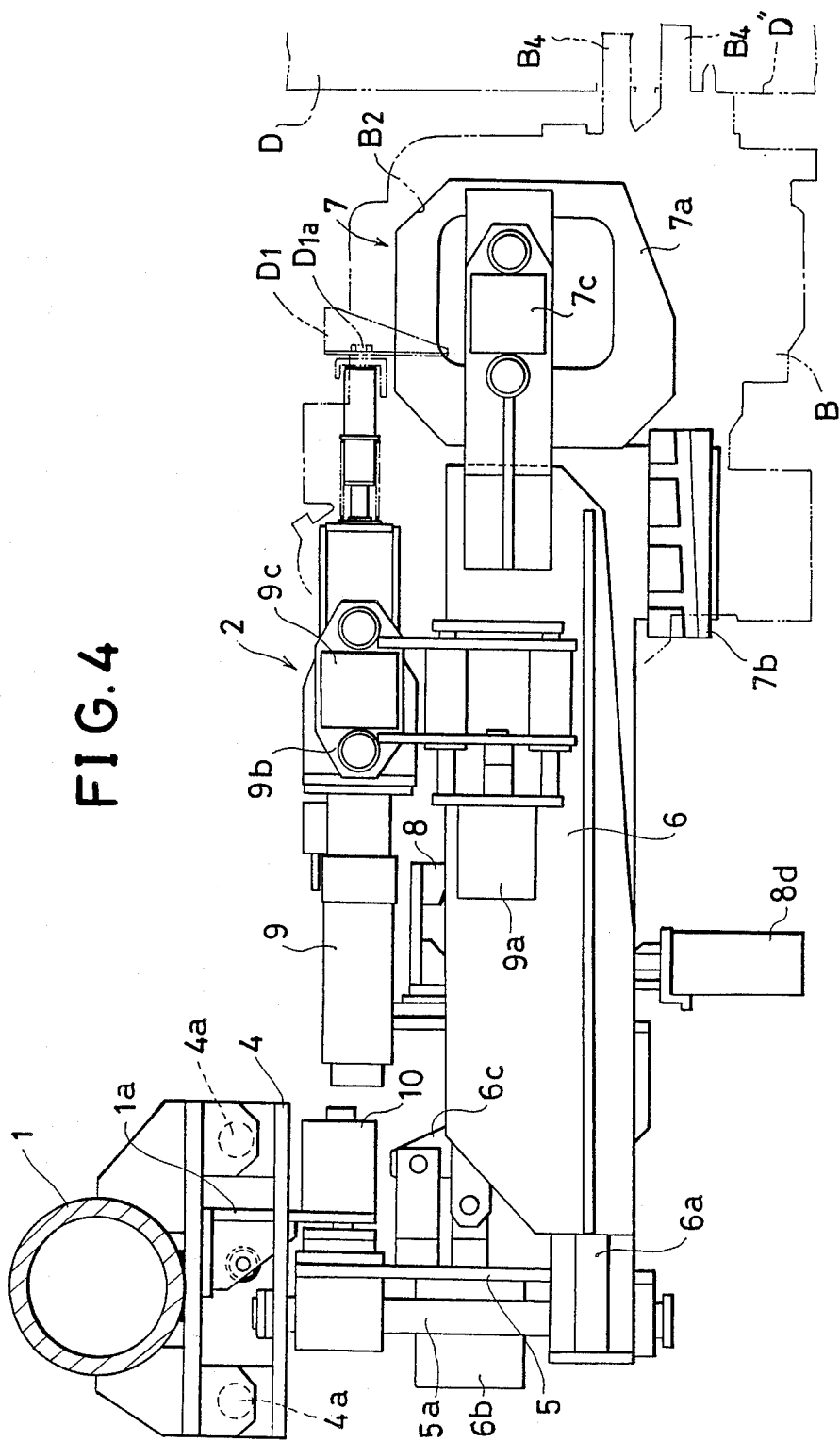
FIGS. 4 and 5 are respectively an enlarged sectional view taken along the line IV—IV in FIG. 2 and another taken along the line V—V also in FIG. 2.
Figure 5:
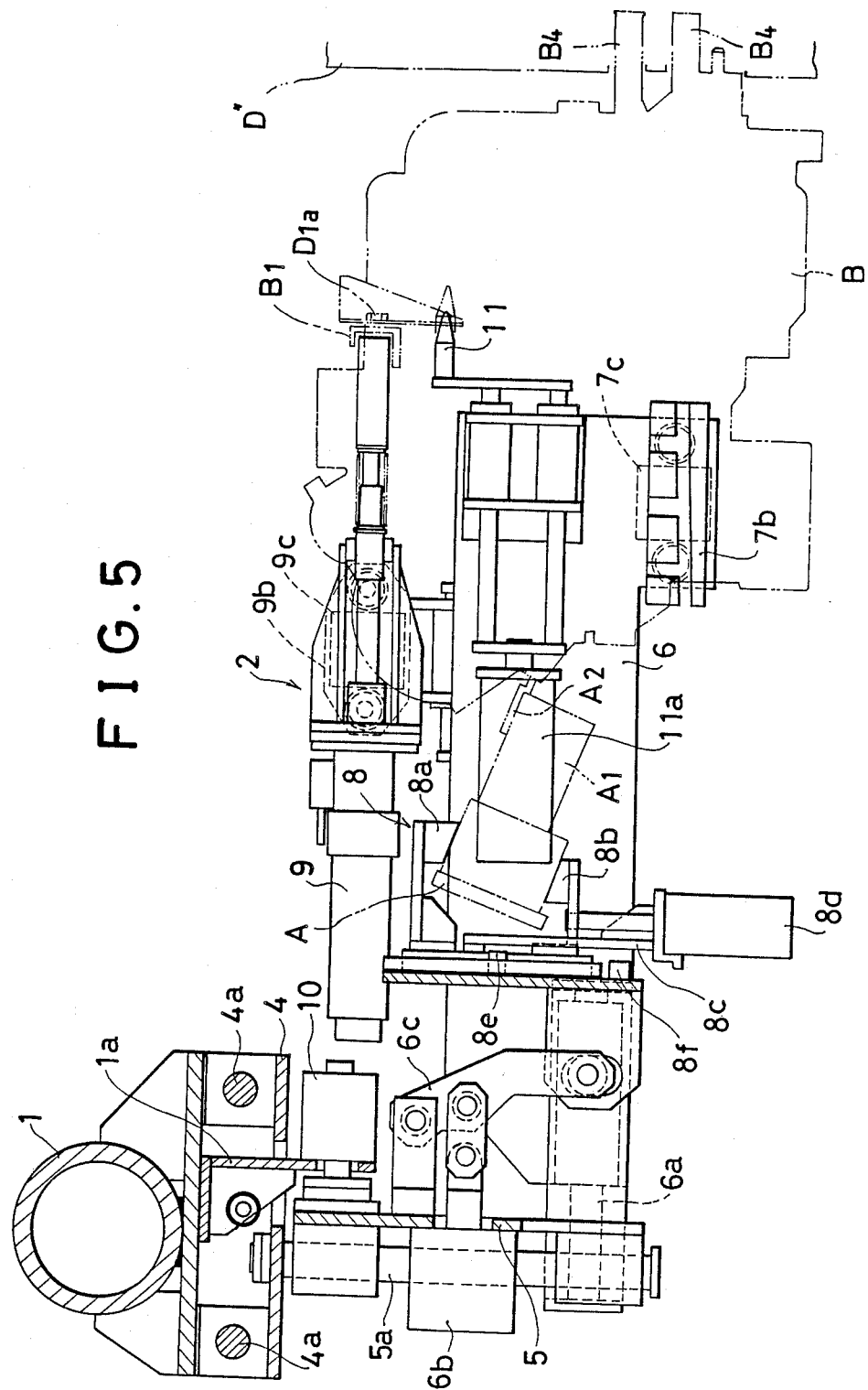
Figure 6:
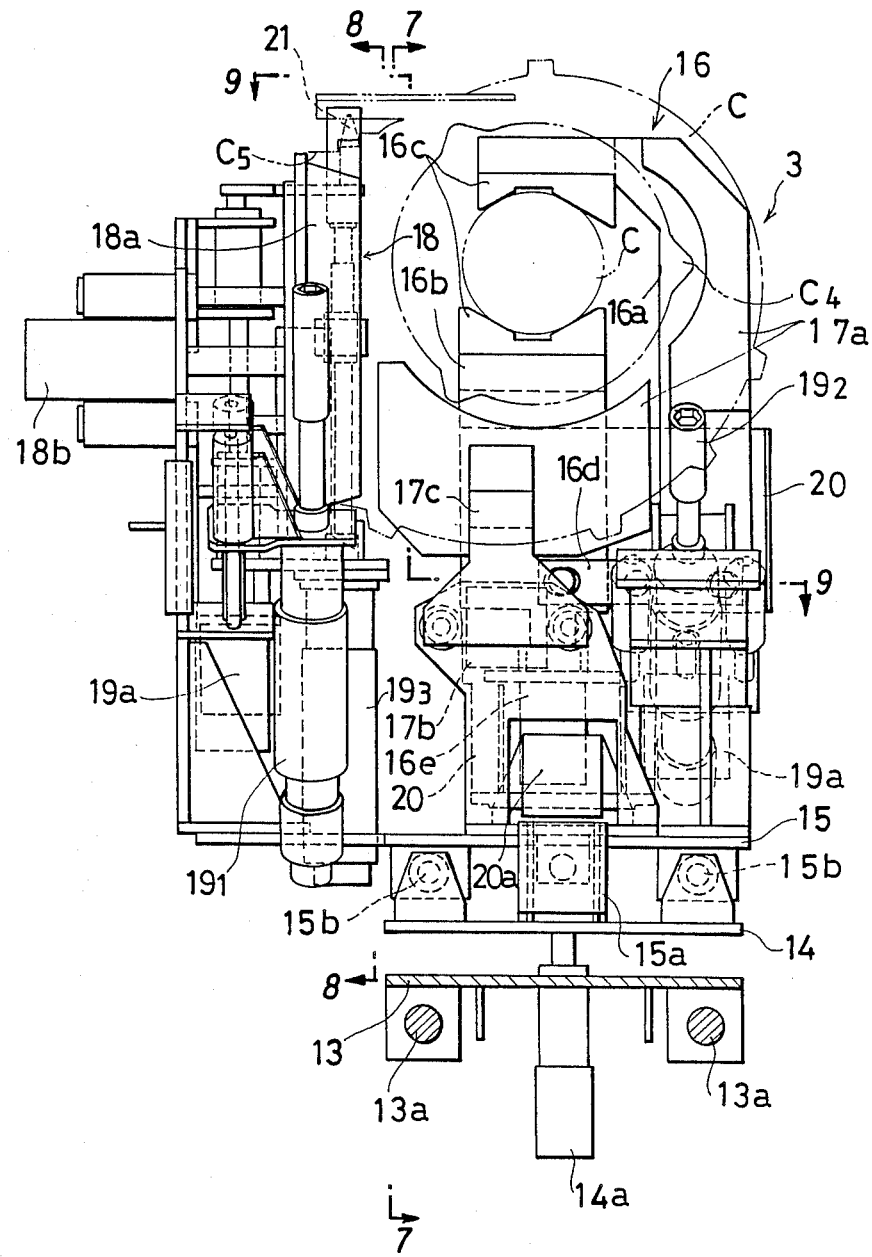
FIG. 6 is an enlarged top plan view of the second assembling jig as viewed in the direction indicated by VI—VI in FIG. 1.
Figure 7:
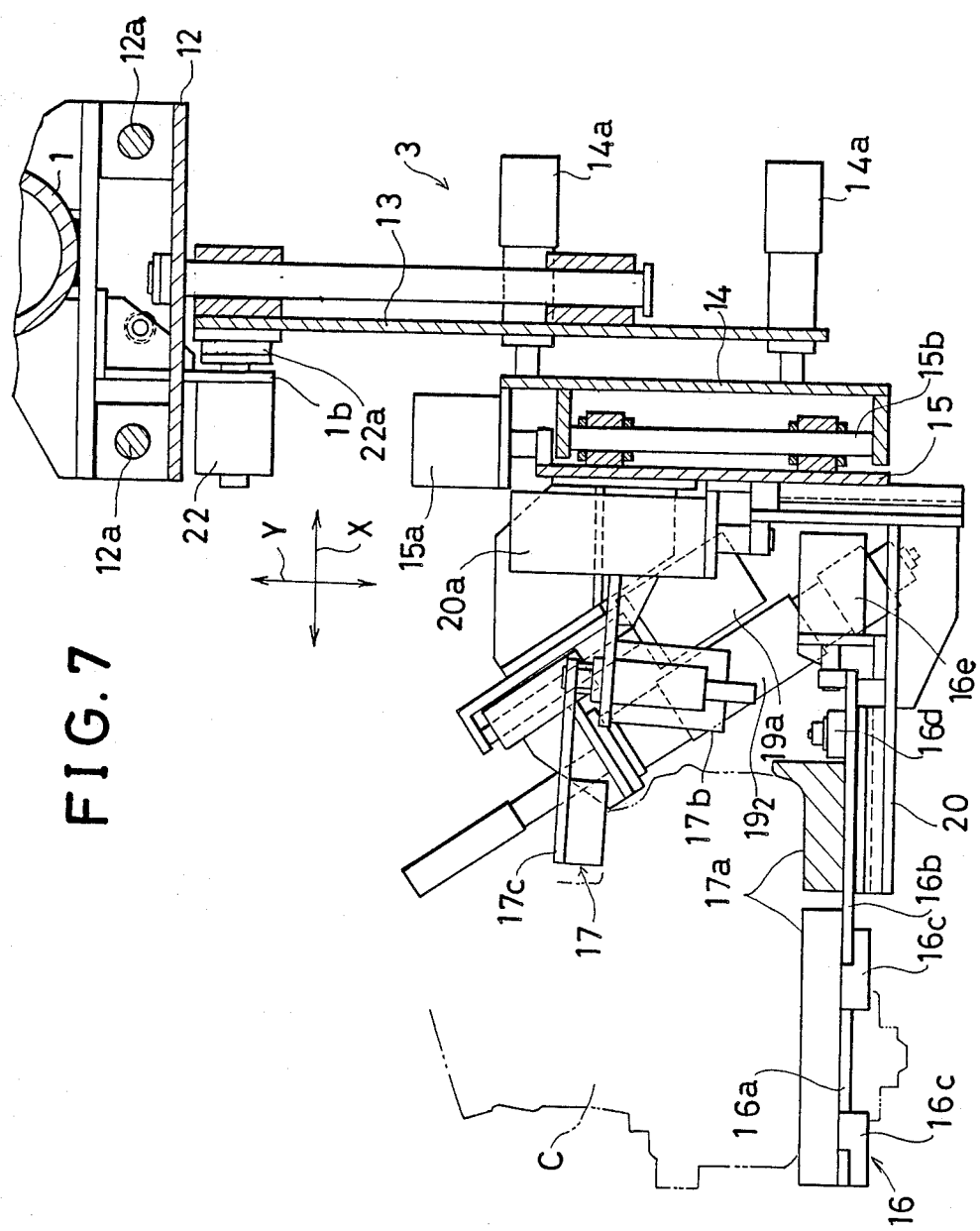
FIGS. 7 through 9 are sectional views taken along the lines VII—VII through IX—IX respectively in FIG. 6.
Figure 8:
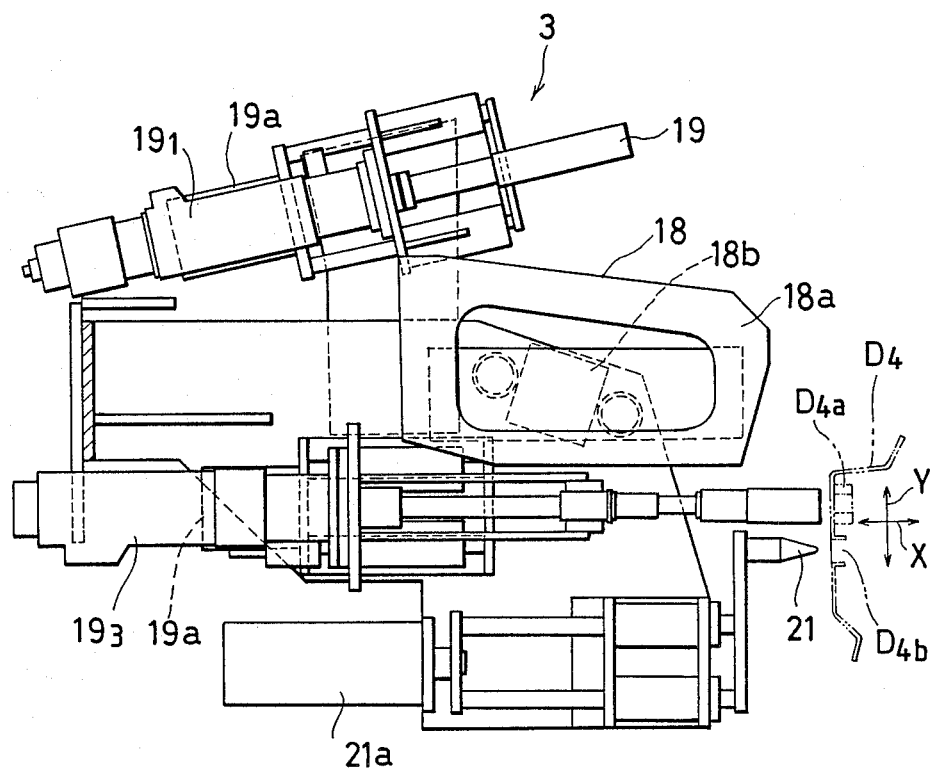
Figure 9:
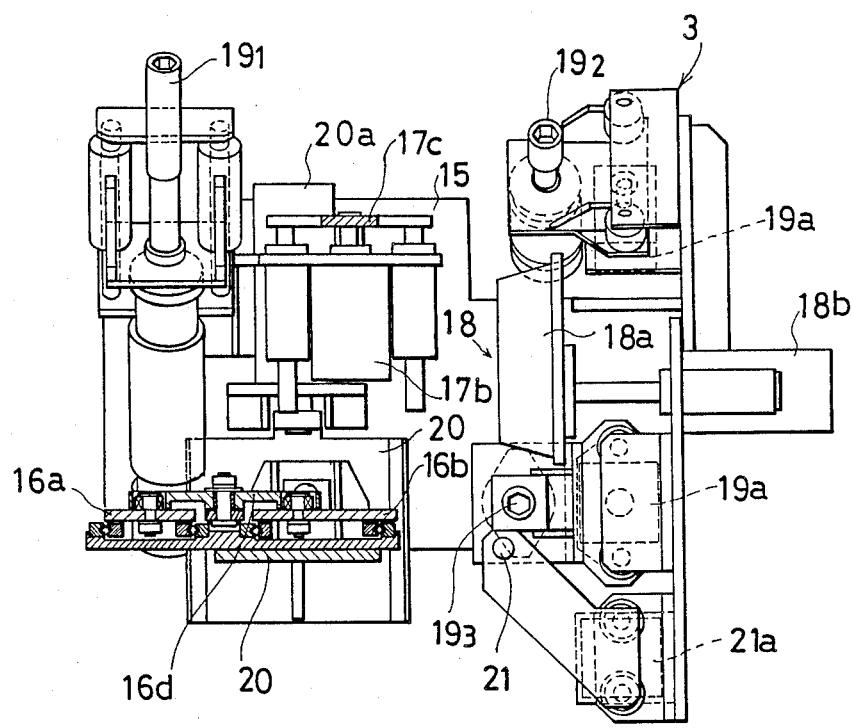

Referring to FIGS. 1 through 3, a robot arm 1 is provided on an assembling robot disposed by the side of an assembling station in which a vehicle body is held stationary. Mounted on the robot arm 1 are a first assembling jig 2 that holds the heater control panel A and the heater unit B and a second assembling jig 3 that holds the blower unit C. By operation of the robot arm 1, these assembling jigs 2, 3 can be moved to get into the inside of the cabin through a door opening of the vehicle body.

As shown in FIGS. 2 through 5, the first assembling jig 2 includes a first floating frame 4 slidable supported on the robot arm 1 so as to be slidable in a lateral direction along guide bars 4a, 4a; a second floating frame 5 supported on the first floating frame 4 and slidable vertically along guide bars 5a, 5a; a first jig frame 6 which is U-shaped as viewed from above supported on the second floating frame 5 to be slidable forward and backward along guide bars 6a, 6a and moved forward and backward via a lever 6c by operation of a cylinder 6b; a first clamp means 7 which is provided on the first jig frame 6 and holds the heater unit B by gripping it from both the left and right sides; a second clamp means 8 also provided on the first jig frame 6 which holds the heater control panel A by gripping it from above and below; and a pair of nut runners 9 on the first jig frame 6 which are used to bolt each of the stays B1 of the heater unit B to each of the brackets D1 respectively.

The first clamp means 7 comprises a clamp member 7a designed to fit into an air inlet B2 provided in the right side portion of the heater unit B and another clamp member 7b designed for engagement with a rib B3 provided on the lower left portion of the heater unit B. The clamp members are arranged on the right and left side plate portions of the first jig frame 6 so that they may be moved in the lateral direction respectively by cylinders 7c so as to be opened and closed. The second clamp means 8 comprises a pair of upper and lower clamp arms 8a, 8b which hold the heater control panel A therebetween and which are provided on the front surface of the end plate portion of the first jig frame 6 and are slidable in the vertical direction. A bracket 8c projects downward from the upper clamp arm 8a. A cylinder 8d is mounted on the bracket 8c with a piston rod of the cylinder 8d connected to the lower clamp arm 8b. A pair of upper and lower stoppers 8e, 8f are used to check the downward movements of the pair of the clamp arms 8a, 8b. With the contracting operation of the cylinder 8d, the upper clamp arm 8a moves down to the check point at which its further downward movement is checked by the upper stopper 8e, and thereafter the lower clamp arm 8b moves upward for both the upper and lower clamp arms 8a, 8b to close. With the expanding operation of the cylinder 8d, the lower clamp arm 8b moved downward to the check point at which its farther downward movement is checked by the lower stopper 8f and thereafter the upper clamp arm 8a moves upward for both the upper and lower clamp arms 8a, 8b to open.

The first jig frame 6 arranged so that it can be moved vertically and horizontally with the sliding movements of first and second floating frames 4, 5, that is, it can make a floating movement in a vertical plane. Attached to the bracket 1a projecting downward from the robot arm 1 is a first locking cylinder 10 which checks the second floating frame 5. The first jig frame 6 is normally kept bound at a predetermined position by operation of the first locking cylinder 10. After the robot arm 1 is moved from its put-in position at which it is inserted into the inside of the vehicle cabin, the put-in position being indicated by the two-dot line in FIG. 1, to its farthest advanced position indicated by the solid line also in FIG. 1, the first jig frame 6 is released from the binding and at the same time a positioning pin 11 provided on the left side plate portion thereof is advanced by the cylinder 11a. While the first jig frame 6 is kept performing the floating movement, the pin 11 is fitted into a reference hold D1b formed in the left one of the brackets D1, D1 so that the first jig frame 6, that is, the first assembling jig 2 may be positioned properly with respect to the dashboard D. Thereafter, the first jig frame 6 is moved forward by operation of the cylinder 6b and inlet/outlet pipes B4, B4 for engine-cooling water on the front surface of the heater unit B are inserted through the lower part D" of the dashboard D while each stay B1 is placed to overlap each bracket D1. In this condition, each nut runner 9 is operated to tighten the bolt in the nut D1a securely fixed to each bracket D1.

Each nut runner 9 is mounted on a movable frame 9b via a cylinder 9c so that its position can be switched over in the lateral direction. A movable frame 9b is provided on each side plate portion of the first jig frame 6 in such a manner that it can move forward and backward by a cylinder 9a.

As shown in FIGS. 2, 3, and 6–10 the second assembling jig 3 includes a third floating frame 12 held on the robot arm 1 and laterally slidable along guide bars 12a, 12a; a fourth floating frame 13 supported on the third floating frame 12 and slidable along guide bars 13a, 13a in a slanting up-and-down direction (hereinafter referred to as Y-axis direction) perpendicular to a direction normal to the bracket D4 (hereinafter referred to as X-axis direction); a second jig frame 15 supported on the fourth floating frame 13 which is moved up and down by a cylinder 15a in the Y-axis direction along guide bars 15b, 15b through an intermediate frame 14 which is movable by cushion rods 14a, 14a towards the rear in the X-axis direction for cushioning operation; a clamp means provided on the second jig frame 15 to hold the blower unit C which includes a third clamp means 16 which clamps a blower motor C4 at the bottom surface of the blower unit C by gripping it from the front and the rear thereof, a fourth clamp means 17 that clamps the rear portion of the blower unit C by gripping it from above and below, and a fifth clamp means 18 designed to fit into the left-side outlet C5 of the blower unit C; and three nut runners 19₁, 19₂, 19₃, supported on the second jig frame 15 which are used to fasten the corresponding stays C1, C2, C3 of the blower unit C to the fitting supports D2, D3 and the bracket D4 by bolts. The nut runners are arranged so that each of them may be moved to and fro by each cylinder 19a respectively in the predetermined tightening direction.

The third clamp means 16 includes a pair of clamp arms 16a, 16b provided in parallel sideways to each other. The clamp arms 16a, 16b are supported to be slidable back and forth on a movable frame 20 which is mounted on the front surface of the end plate portion of the second jig frame 15 to be movable up and down by a cylinder 20a. One clamp arm 16a is made to extend further forward than the other clamp arm 16b so that the front ends of both clamp arms 16a, 16b may be provided with carrier seats 16c, 16c arranged to respectively contact the front and the rear portions of the circumferential surface of the blower motor c4. A lever 16d spanning the rear ends of the clamp arms 16a, 16b is pivotally supported at its middle portion on the movable frame 20. A cylinder 16e that moves the rear clamp arm 16b back and forth is mounted on the movable frame 20. In this arrangement, the front clamp arm 16a operated through the lever 16d and the rear clamp arm 16b operated directly are moved to and fro by the cylinder 16e in mutually opposite directions in order for the third clamp means 16 to operate to open and close.

The fourth clamp means 17 comprises a carrier seat 17a provided to receive the bottom surface of the blower unit C mounted on the upper surfaces of the clamp arms 16a, 16b, and an upper clamp arm 17c that is moved up and down by a cylinder 17b. By operation of the movable frame 20 combined with that of the cylinder 17b, the carrier seat 17a and the clamp arm 17c are moved up and down in mutually opposite directions so as to cause the fourth clamp means 17 to open and close. The fifth clamp means 18 is provided with a clamping member 18a which is shaped to conform to the outlet C5 of the blower unit C and is mounted on the left side plate portion of the second jig frame 15 movable laterally by the cylinder 18b.

Owing to the sliding operations of the third and fourth floating frames 12, 13 with respect to the robot arm 1, the second jig frame 15 can perform a floating movement in a plane perpendicular to the X-axis direction. A reference hole D4b opening in the X-axis direction is formed in the bracket D4 so as to be located below a fixing nut D4a which is used for fastening the stay C3 in place by a bolt. On the left side plate portion of the second jig frame 15 is provided a positioning pin 21 which is moved by a cylinder 21a in the X-axis direction. The second jig frame 15, that is, the second assembling jig 3 is then properly positioned with respect to the dashboard D by having the pin 21 fitted into the reference hole D4b while the second jig frame 15 is kept held in a state in which it can perform the floating movement. Attached to the bracket 1b projecting downward from the robot arm 1 is a second locking cylinder 22 equipped with a magnetic pad 22a which can be put in pressure contact with the fourth floating frame 13 to stop said frame so that the second locking cylinder 22 is operated to bind the second jig frame 15 to remain at any desired floating position.

The third and fourth floating frames 12, 13 are so arranged that they may be returned respectively to their predetermined neutral positions by neutral springs (not shown). Normally, with the third and fourth floating frames 12, 13 returned to their neutral positions, the second locking cylinder 22 is operated to bind the second jig frame 15 to remain at the predetermined position.

The blower unit C is assembled to the dashboard D in such a manner that an air inlet C6 provided on the top side thereof is tightly fastened to the underside surface of the right-side corner portion of the upper part D' of the dashboard D. As the robot arm 1 is moved to its farthest advanced position, the blower unit C is conveyed to the pre-assembly position b indicated on FIG. 10 and then the cylinder 15a is operated to move the second jig frame 15 upwards along the Y-axis direction and thereby move up the blower unit C to the assembly position indicated by c also on FIG. 10. In this condition the respective stays C1, C2, C3 are securely fastened in place by bolts. However, since there is left a very small gap between the blower unit C and the right side wall of the dashboard D and there are connecting cords F for the blower unit C hanging out of the side wall, the robot arm 1 could be interfered with by the blower unit C and the cords F or the like if the robot arm 1 should be moved straight on to its farthest advanced position.

Figure 11:
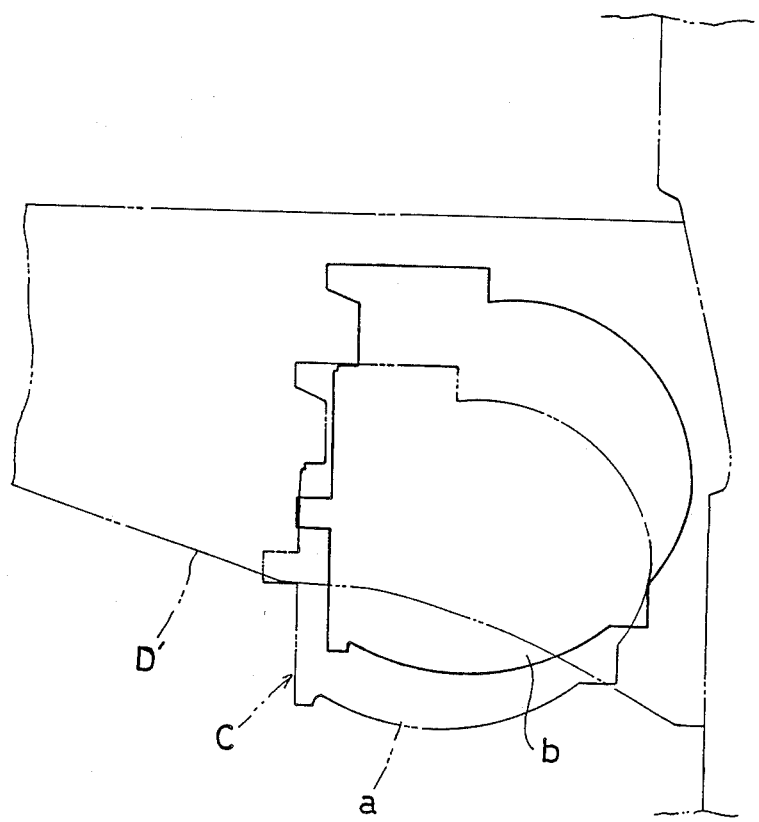
FIG. 11 is a top plan view thereof.

Therefore, the robot arm 1 is kept deviated somewhat leftward when moving up to a position just on this side of the farthest advanced position. After that, it is moved non-linearly from said this-side position to the farthest advanced position while turning somewhat rightward so as to convey the blower unit C from the position a indicated on FIG. 11 to the pre-assembly position b indicated also on FIG. 11 along a curved track which prevents the blower unit C from interfering with the cords F.

Figure 10:
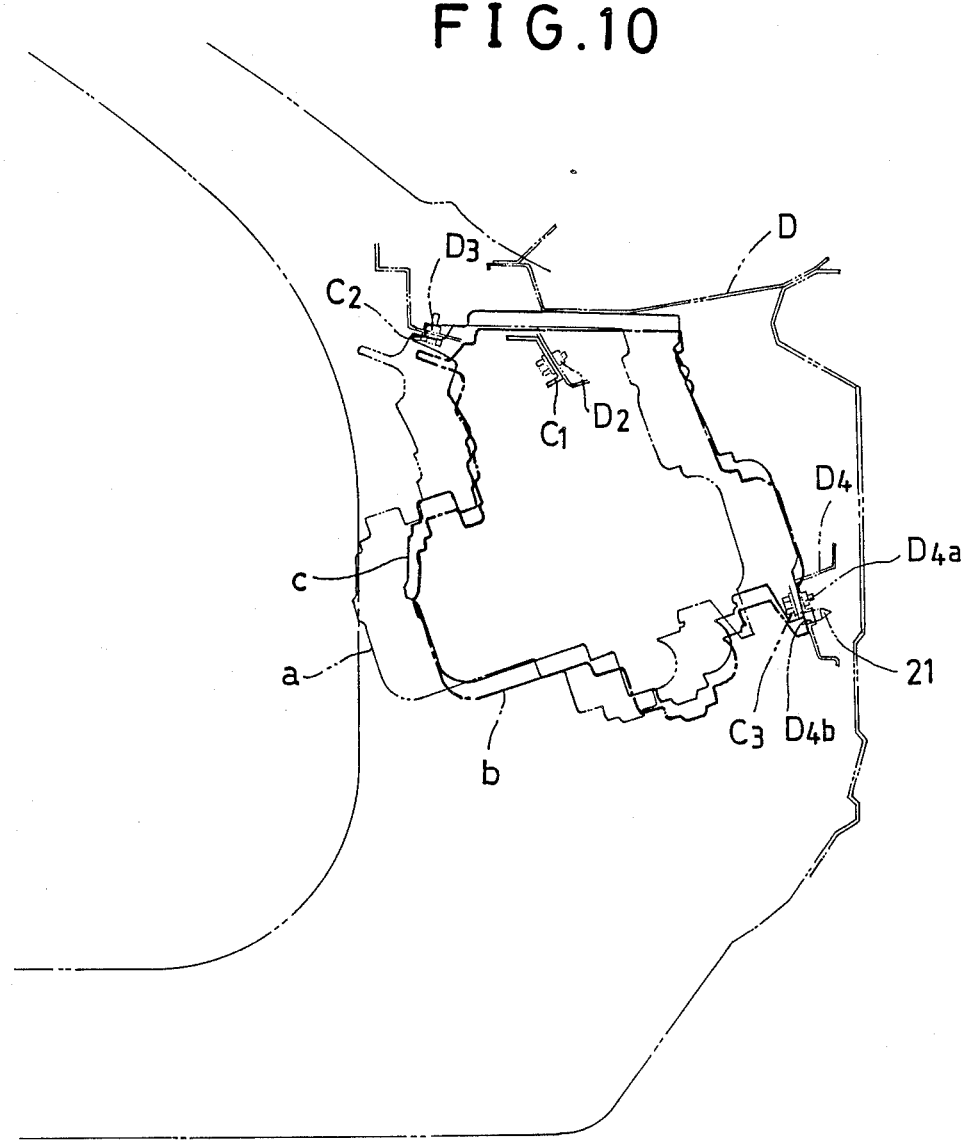
FIG. 10 is a profile diagram showing the moving course of the blower unit when it is being assembled.

When the robot arm 1 has reached the this-side position, the blower unit C is at the position indicated by a on FIG. 10, in which position the robot arm 1 temporarily stops moving. While the robot arm 1 is at this pause position, the second jig frame 15 is turned to a state in which it can perform the floating movement and the positioning pin 21 is fitted into the reference hold D4b, whereby the second jig frame 15 is properly positioned with respect to the dashboard D. In this condition, the second locking cylinder 22 is operted to bind the second jig frame 15. Thereafter, the positioning pin 21 is disengaged from the reference hole D4b and the robot arm 1 is moved non-linearly to its farthest advanced position as described in the foregoing.

According to the foregoing arrangements, even when a positional deviation occurs of the dashboard D and the robot arm 1 relative to each other due to a positional deivation of the vehicle body, a positional deviation of the blower unit C with respect to the dashboard D is corrected before the robot arm 1 is moved to its farthest advanced position. As the robot arm 1 is moved to the farthest advanced position, the blower unit C is conveyed to the pre-assembly position along the conveying track preset with respect to the dashboard D so that it does not interfere with the cords F in the course of being conveyed as above.

With the robot arm 1 at its farthest advanced position, the stay C3 of the blower unit C comes in contact with the bracket D4, but the reaction force relative to this contact is absorbed by the second jig frame 15 being moved back by the cushion rod 14a towards the rear in the Y-axis direction.

When movement of the robot arm 1 is set so that the blower unit C may be conveyed to the pre-assembly position while making a long detour to go around where the cords F are hanging down, it is not necessarily required to do positioning of the second assembling jig 3 at said this-side position as described in the foregoing. In such an arrangement, however, the robot arm 1 has to travel a longer distance in order to move from said this-side position to the farthest advanced position, so that it takes more time. Even in this arrangement, it is necessary to carry out, at the farthest advanced position of the robot arm 1, positioning of the second assembling jig 3 with respect to the dashboard D for the positional adjustment between the dashboard D and the blower unit C. As a result, it requires a longer time to achieve the required movement as compared with the present invention, so that the work efficiency should be lowered.

Figure 12:
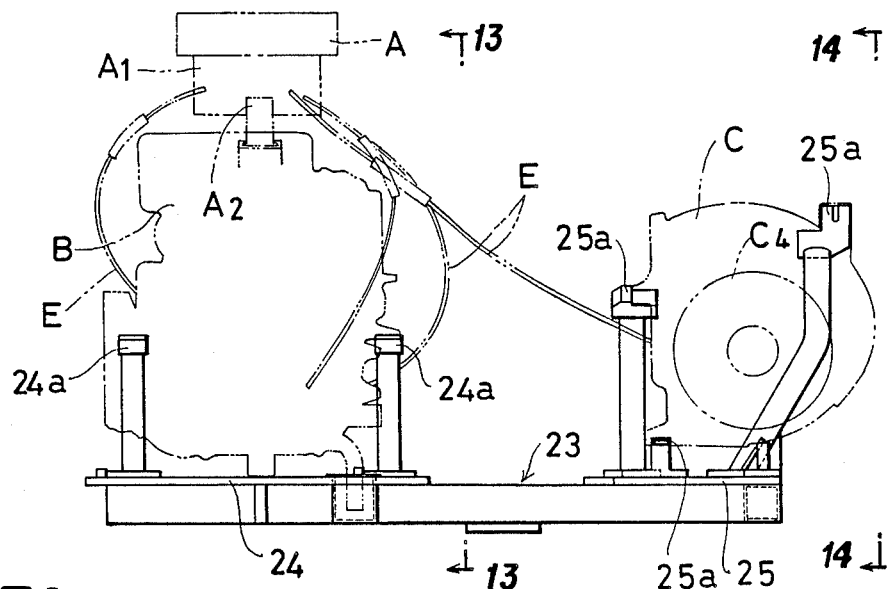
FIG. 12 is a front view of the set jig.
Figure 13:
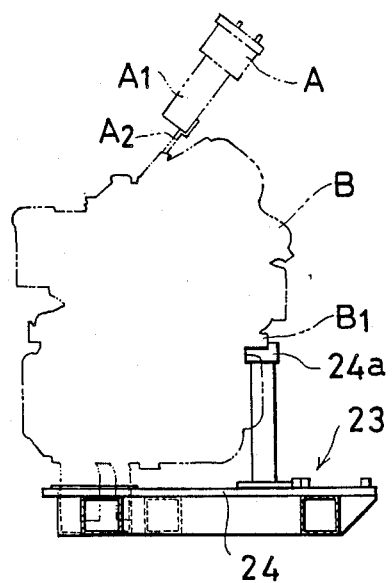
FIGS. 13 and 14 are side views thereof as seen from the side indicated by the line XIII—XIII and that by XIV—XIV respectively in FIG. 12.
Figure 14:
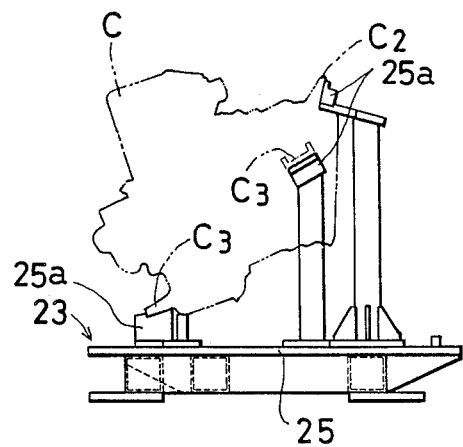

FIGS. 12 through 14 show a set jig 23 disposed on one side of the location at which the assembling robot is placed. There are provided in parallel to each other on the upper surface of the set jig 23 a first set bedplate 24 having a plurality of work receivers 24a which can support thereon the heater unit B positioned so as to have its front surface (which is the surface facing the dashboard when assembled thereto) face downwards and a second set bedplate 25 having a plurality of work receivers 25a which can support thereon the blower unit C positioned likewise so as to have its front surface face downwards, so that the heater unit B and the blower unit C can be set on the set jig 23 to have the same positional relationship therebetween as when actually assembled to the dashboard D. Bolts can be set respectively on the work receivers 24a which receive the respective stays B1 of the heater unit B and also on the work receivers 25a which receive the stays C1, C2, C3 of the blower unit C.

To carry out the assembly, operations are performed as follows: The heater unit B, the blower unit C and the bolts are set on the set jig 23; the heater control panel A is attached to the heater unit B and then each of the heater unit B and the blower unit C is connected to the panel A by means of cables E for wiring; next, the robot arm 1 being held in a state in which it has been turned to as to have each of the assembling jigs 2, 3 face downwards is moved to a location above the set jig 23 and then downwards therefrom; the first clamp means 7 and the second clamp means 8 of the first assembling jig 2 are closed to clamp the heater unit B and the heater control panel A respectively while the third, fourth and fifth clamp means 16, 17, 18 of the second assembling jig 3 are closed in sequence to clamp the blower unit c; the respective bolts are properly inserted into the sockets provided at the top ends of the nut runners 9, $19_1$, $19_2$, $19_3$ of the assembling jigs 2, 3, and in this condition, the robot arm 1 is moved upwards to let the assembling robot receive the heater control panel A, the heater unit B and the blower unit C which are held in their proper positional relationship with one another; next, the robot arm 1 is turned for both of the assembling jigs 2, 3 to take a forward-facing posture and then inserted into the cabin of the vehicle; thereafter, the robot arm 1 is moved to a position on this side of its farthest advanced position and temporarily stopped there and, after the second assembling jig 3 is properly positioned with respect to the dashboard D by fitting the positioning pin 21 into the reference hold D4b, the arm 1 is moved to the farthest advanced position; now, after the second assembling jig 3 is moved up in the Y-axis direction by operation of the cylinder 15a, the respective nut runners $19_1$, $19_2$, $19_3$ are operated to fasten by bolts the respective stays C1, C2, C3 to the fitting supports D2, D3 and the bracket D4; the first assembling jig 2 is then positioned relative to the dashboard D by fitting the positioning pin 11 into the reference hold D1b; thereafter, the cylinder 6b is operated to advance the jig 2; and each nut runner 9 is operated to fasten by bolts each stay B1 of the heater unit B to each corresponding bracket D1 to complete the assembling work.

In the foregoing, the description is given of an embodiment of the present invention in which this invention is applied to assembling three components associated with one another through cables E including a heater control panel A, a heater unit B and a blower unit C, but it is also possible to apply the present invention to assembling other associated components which are associated with one another through such wiring or connecting materials as cords.

As described in the foregoing, according to the present invention, wiring work to connect a plurality of associated components to one another is performed while they are held set on a set jig so that there can be secured a much wider working space to facilitate the wiring work. Furthermore, using a common assembling robot after carrying out the wiring work, these associated components are altogether assembled to an article, thus contributing remarkably to improvement of productivity involved.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method for assembling a plurality of associated components which are associated with one another through wiring materials to an article comprising setting the associated components on a common set jig to have a predetermined mutual positional relationship with one another; connection wiring between said components by the wiring materials; grasping the components on a common assembling robot while they are kept held in said predetermined mutual positional relationship, said common assembling robot comprising a robot arm and a plurality of assembling jigs mounted on the arm to hold these associated components; and moving and operating assembling robot to assemble the components to the article at predetermined fixing spots thereof.

2. A method for assembling a plurality of associated components according to claim 1 wherein when one of said plurality of associated components is to be mounted at a location where interference with the article to which the components are to be assembled can occur, said method further comprises moving the robot arm non-linearly from a position at one side of its farthest advanced position toward the article to said farthest advanced position so that said one of said plurality of associated components does not interfere with the article; pausing in the movement of the robot arm for a temporary pause at said one side position and, during the pause, fitting a positioning pin provided on an assembling jig which holds said components into a reference hole formed on the article while the assembling jib floats with respect to the robot arm in a plane perpendicular to an axial line of the positioning pin and after the positioning pin is fitted, binding the assembling jig with respect to the robot arm; disengaging the positioning pin from the reference hold and moving the robot arm from said one side position to said farthest advanced position; and then with the robot arm held at the farthest advanced position, moving the respective assembling jigs in the predetermined assembling direction with respect to the robot arm so that the respective associated components held on the respective assembling jigs are assembled to the article at the predetermined fixing spots thereof.

* * * * *